Sept. 13, 1932.  H. A. DOUGLAS  1,876,876
CIRCUIT CONTINUING DEVICE
Filed Feb. 3, 1930  2 Sheets-Sheet 1
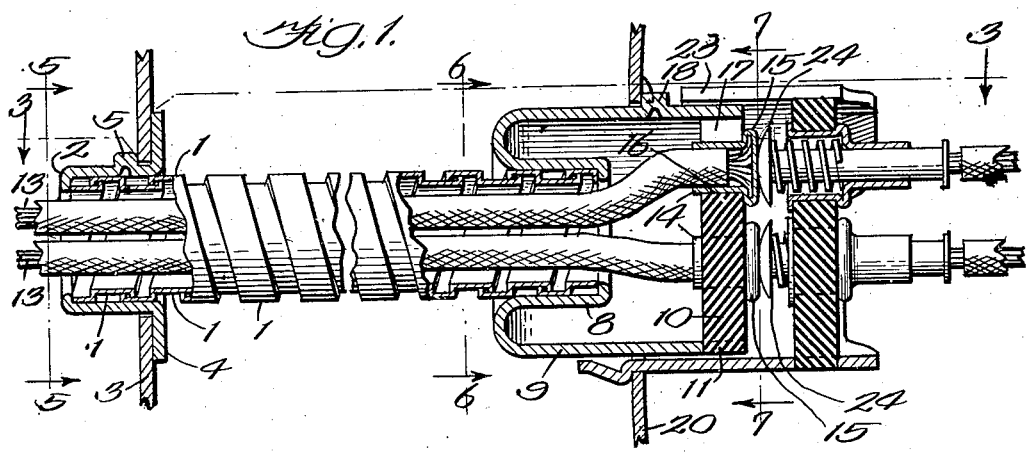
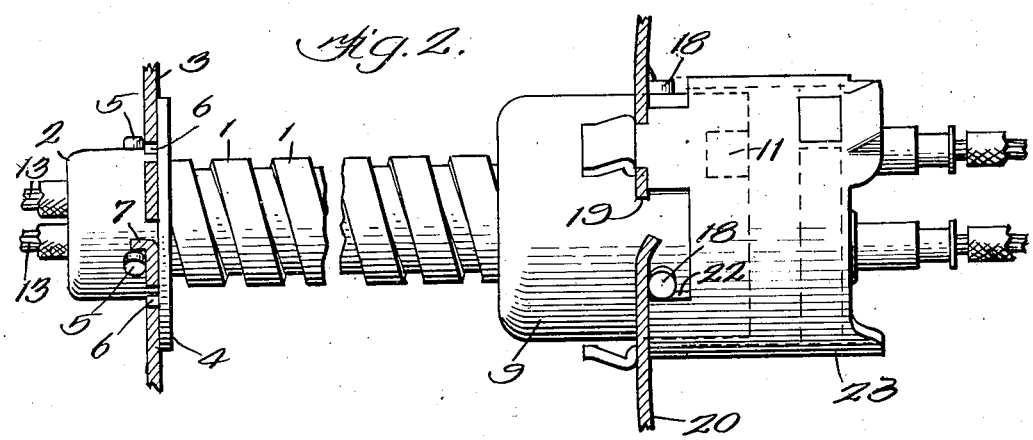
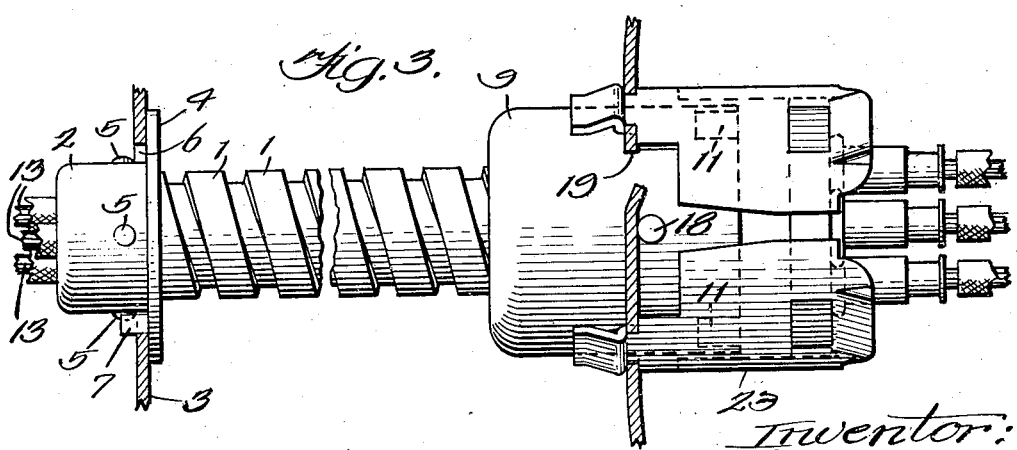
Inventor:
Harry A. Douglas Sept. 13, 1932.  H. A. DOUGLAS  1,876,876
CIRCUIT CONTINUING DEVICE
Filed Feb. 3, 1930  2 Sheets-Sheet 2
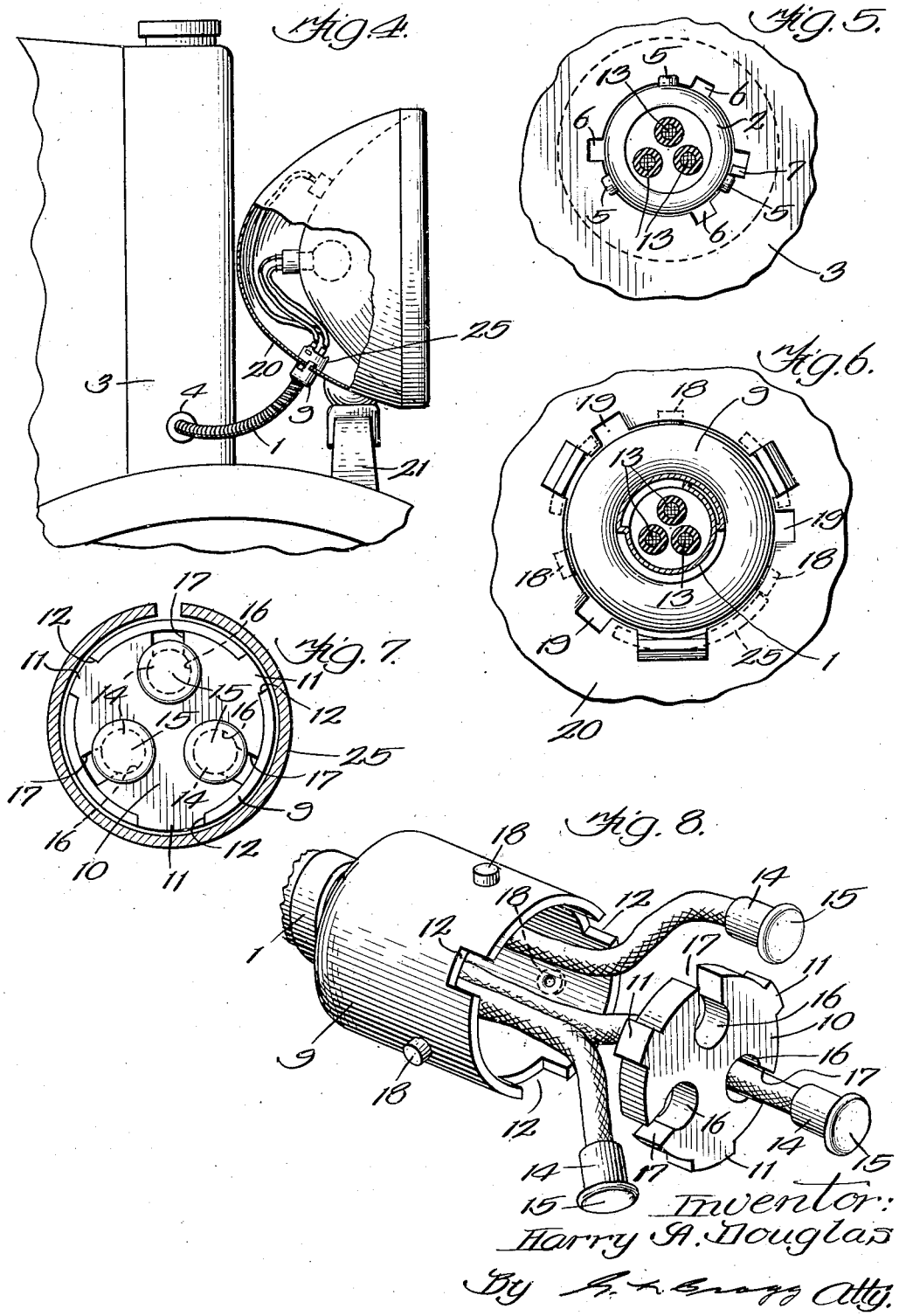

Patented Sept. 13, 1932

1,876,876

UNITED STATES PATENT OFFICE

HARRY A. DOUGLAS, OF BRONSON, MICHIGAN

CIRCUIT CONTINUING DEVICE

Application filed February 3, 1930. Serial No. 425,544.

My invention relates to flexible conduits and has for its general object the provision of improved means for assembling the ends of the conduits with mountings therefor. My invention is of particular service where the conduits are employed for housing circuit conductors which extend to contacts upon contact carriers of circuit continuing devices. In carrying out my invention in connection with circuit continuing devices I employ a conduit for the conductor or conductors leading to the contact or contacts upon the contact carrier and a mounting for and adapted to receive the carrier and to be automatically placed in a position by the conduit to prevent separation thereof from the mounting. For this purpose the conduit is made of resilient material and is placed under torsional strain to permit of the assembly of the carrier and the mounting for the carrier, the conduit sufficiently untwisting after the carrier and mounting have been assembled to place the carrier in such position with respect to the mounting as to prevent the withdrawal of the carrier. The end of the conduit which is contiguous to the carrier, that is thus held in assembly with its mounting, is also held in assembly with such mounting through the intermediation of the carrier. The carrier thus constitutes a coupling between the contiguous end of the conduit and the mounting for the carrier, whereby this conduit end is held in place. As I have practiced my invention the other end of the conduit is also provided with a coupling which is similarly assembled with another mounting. Both mountings are in fixed relation so that when the conduit is twisted each end thereof may be positioned to be assembled with its mounting, whereafter both couplings turn to hold the conduit ends in assembly with their mountings.

The invention has for another of its objects the provision of an improved assembly between the contact carrier and the contacts upon the ends of the circuit conductors. In carrying out this feature of the invention I employ a plate or disc having a contact receiving aperture formed therethrough which snugly receives the shank or body portion of such a contact and which recess has a lateral continuation of lesser width than the contact shank receiving portion and through which the conductor extending to the contact may be passed laterally of the disc or plate. After the conductor has been passed into the larger portion of the recess, it is pulled upon to bring the shank of the contact into such larger recess portion, the accompanying movement of the contact being limited by a flange which is provided upon the contact and which engages the plate or disc. This flange is the engaging face of the contact, the part thereof that is engaged by a complemental contact of the circuit continuing device.

I will explain my invention more fully by reference to the accompanying drawings in which Fig. 1 is an elevation, mainly in section, illustrating the preferred embodiment of the invention; Fig. 2 is a view similar to Fig. 1, but showing more parts in full elevation; Fig. 3 is a view taken generally upon line 3—3 of Fig. 1; Fig. 4 is a view, mainly in elevation, illustrating the adaptation of my invention to a head lamp which is mounted upon an automotive vehicle; Fig. 5 is a sectional view on line 5—5 of Fig. 1; Fig. 6 is a sectional view on line 6—6 of Fig. 1; Fig. 7 is a sectional view on line 7—7 of Fig. 1; and Fig. 8 is a perspective view illustrating a socket, a contact carrier adapted to be held by the socket and the continuous ends of circuit conductors, all in separated relation.

The conduit illustrated is made of intermeshing spirally wound metallic members 1 of well known construction. The metal employed is desirably highly resilient or spring-like so that when the conduit is released, after being twisted, it will tend to resume the set originally imparted to it. One end of the conduit is snugly received within a metallic cup shaped socket 2 whose body portion is passed through an opening in the mounting 3 and whose flange or rim 4 engages the front of said mounting. As illustrated in Fig. 4 the mounting 3 is a wall portion of an automobile radiator. A number of pins or lateral enlargements 5 extend radially from the body portion of the cup 2 and the opening in the mounting 3 is provided with lateral enlargements 6 through which the pins 5 are passed when the body of the cup is being passed through the mounting 3. An abutment 7 is struck from the mounting 3 for the purpose of engaging one of the pins 5 through the influence of the conduit, when this conduit is placed under torsional strain, whereby reentry of the pins in the opening enlargements 6 is prevented to prevent disassembly of the conduit and said mounting. The cup is desirably soldered to the end of the conduit that receives it and may be said to serve as a coupling between this conduit end and the mounting. A similarly functioning coupling is assembled with the other end of the conduit, this coupling being inclusive of a socket portion 8 which receives this end of the conduit that is soldered in place within this socket portion. This second coupling is also inclusive of a skirted portion 9 constituting an integral continuation of and surrounding the socket 8. This skirted portion 9, itself, constitutes a socket for a contact carrying disc 10 of insulation. This contact carrying disc is formed with a number of fingers 11 which are tightly received within correspondingly shaped notches 12 that are formed in the contiguous end of this socket. The circuit conductors 13 are passed through the conduit and through the bottom of the socket 8 and into the hollow shanks 14 of contacting part 15, which are in the end of flanges upon the shanks 14. The wires of the conductors 13 are soldered to and within the contacts 14, 15. The contact carrying disc is formed with recesses 16 corresponding in diameter to the diameter of the contact shanks 14, these shanks being preferably cylindrical. These recesses have continuations 17 which are narrower than the recesses 16 but sufficiently wide to receive the conductors 13 and their insulating wrappings which, together, are of lesser diameter than the diameters of the shanks. The conductors are slipped sidewise into the openings 17, 16 and after the shanks have been fully placed in line with the larger portions 16 of these openings the conductors are pulled upon to enter the shanks in the openings to an extent which is limited by the engagement of the contact flanges 15 with insulating discs 10. This method of assembly of the conductors and their contacts with the contact carrying disc is simple and effective. The skirted portion 9 is provided with several pins or lateral enlargements 18 which are passed through openings 19 and another mounting 20 which, in the embodiment of the invention illustrated, is the back element of the reflecting head lamp which is carried upon a mounting 21 that is fixed with relation to the mounting 3. A stop 22 is placed near one of the openings 19 to be engaged by one of the pins or lateral enlargements 18. In the process of assembly the flexible conduit is twisted sufficiently so that when the couplers 2, 4 and 8, 9 have been inserted they will be turned, due to the torsional pressure of the conduit to bring one of the pins 5 against the abutment 7 and one of the pins 18 against the abutment 22, whereby the ends of the conduit are maintained in assembly with their mountings 3 and 20.

The stop 22 is desirably provided upon a cylindrical socket shell 23 into which the skirted portion 9 of the conduit coupler 8, 9 may be inserted to bring the contacts 15 into engagement with the spring pressed contacts 24 that are carried by the socket shell 23. The socket shell 23 is assembled with the mounting 20 in accordance with the invention disclosed in my copending application Serial No. 425,542 filed February 3, 1930. It would seem that I have provided a conduit formed of resilient material adapted to be twisted to enable it to exert pressure in an untwisting direction, two mountings one for each end of the conduit, and two couplings one individual to and assembled with each end of the conduit, each coupling being laterally enlarged and the opening in the contiguous mounting being laterally extended to receive the corresponding coupling where laterally enlarged, following twisting of the conduit, the conduit serving in untwisting to place the lateral enlargement of each coupler out of register with the lateral enlargement in the opening in the contiguous mounting to maintain the coupler and mounting in assembly, each mounting having an abutment engaged by the enlargement upon the corresponding coupling to maintain the conduit under partial torsional strain thereby to hold the coupling in assembly with the corresponding mountings. Said abutments 7 and 22 are positioned to permit partial unwinding of the conduit but to prevent its total unwinding, whereby the conduit positively maintains the coupler enlargements 5 and 18 against their corresponding abutments 7 and 22 due to the spring pressure exerted by the conduit which constantly tends to complete its unwinding movement. Features not herein claimed form the subject matter of my divisional application Serial No. 453,506, filed May 19, 1930.

Changes may be made without departing from the invention.

Having thus described my invention, I claim:

The combination with a conductor fixed at one end and at its other end having a tubular metallic contact carrying member thereon, said member being formed with a shank of larger diameter than the conductor and terminating in a flanged contact portion; of a contact carrying disc having a recess which is inclusive of a substantially circular portion spaced from the periphery of the disc and within which the aforesaid shank may be snugly received and said recess having a portion substantially narrower than the diameter of said shank extending from the circular portion to the periphery of the disc and through which the conductor where adjacent the shank may be passed laterally, the shank being snugly receivable into the circular portion of said recess when it is in register with this recess portion and the conductor is pulled upon in a suitable direction, the extent to which the shank is drawn into the circular portion being limited by the flanged contact which is engageable with the disc where it margins the circular portion of the recess, whereby said contact may be positioned on said disc relatively near to the center thereof without disconnecting it from the conductor.

In witness whereof, I hereunto subscribe my name.

HARRY A. DOUGLAS.